Feb. 8, 1944.    P. GRZELAK    2,341,035
TIMBER MOWER
Filed Sept. 30, 1942    2 Sheets-Sheet 1
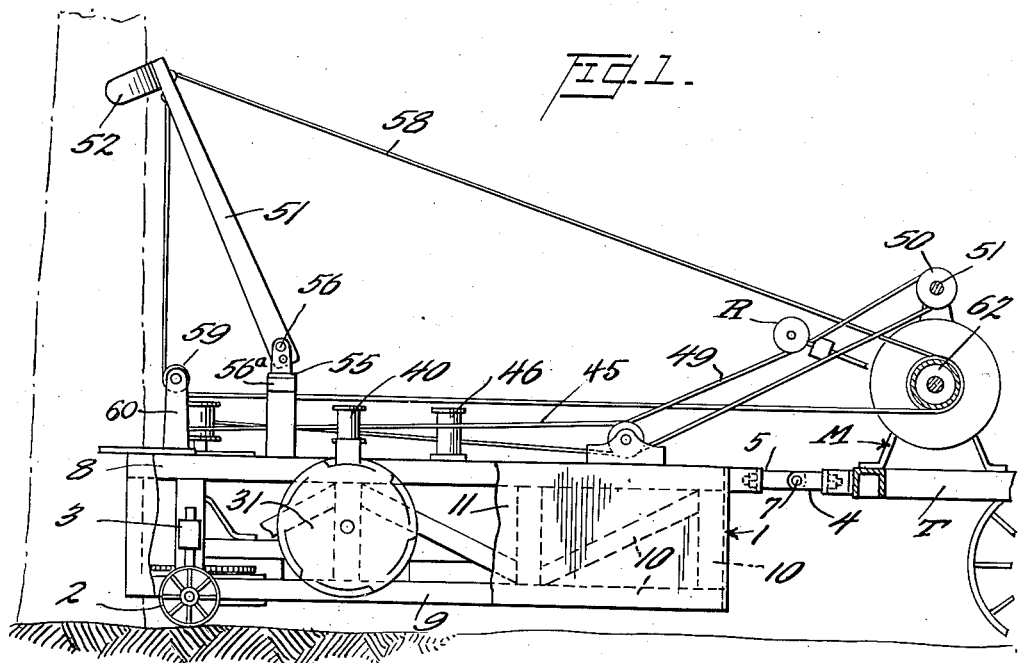
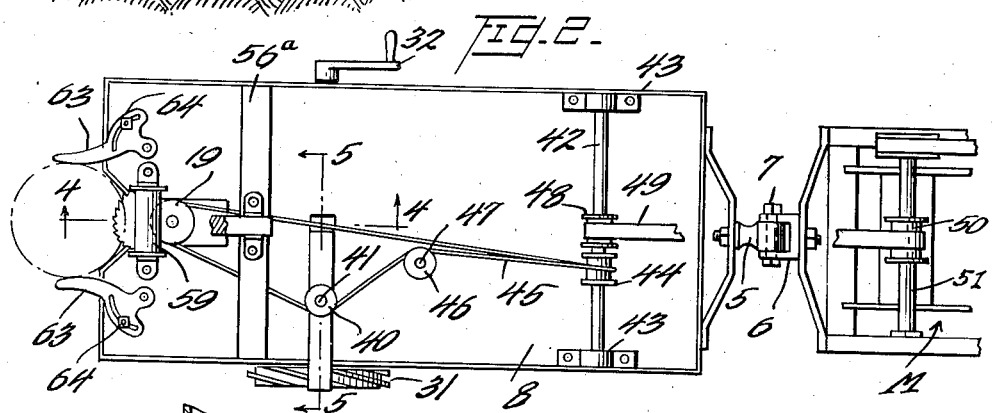
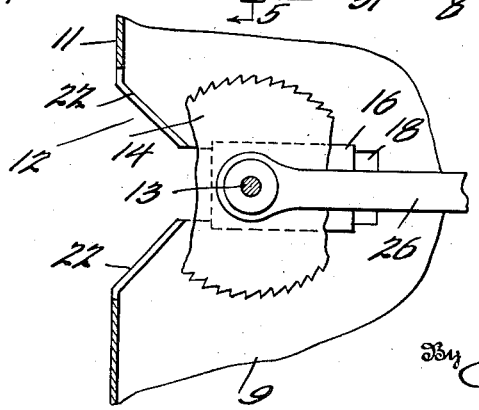
Inventor
Peter Grzelak
By Eugene K. Purdy
Attorney

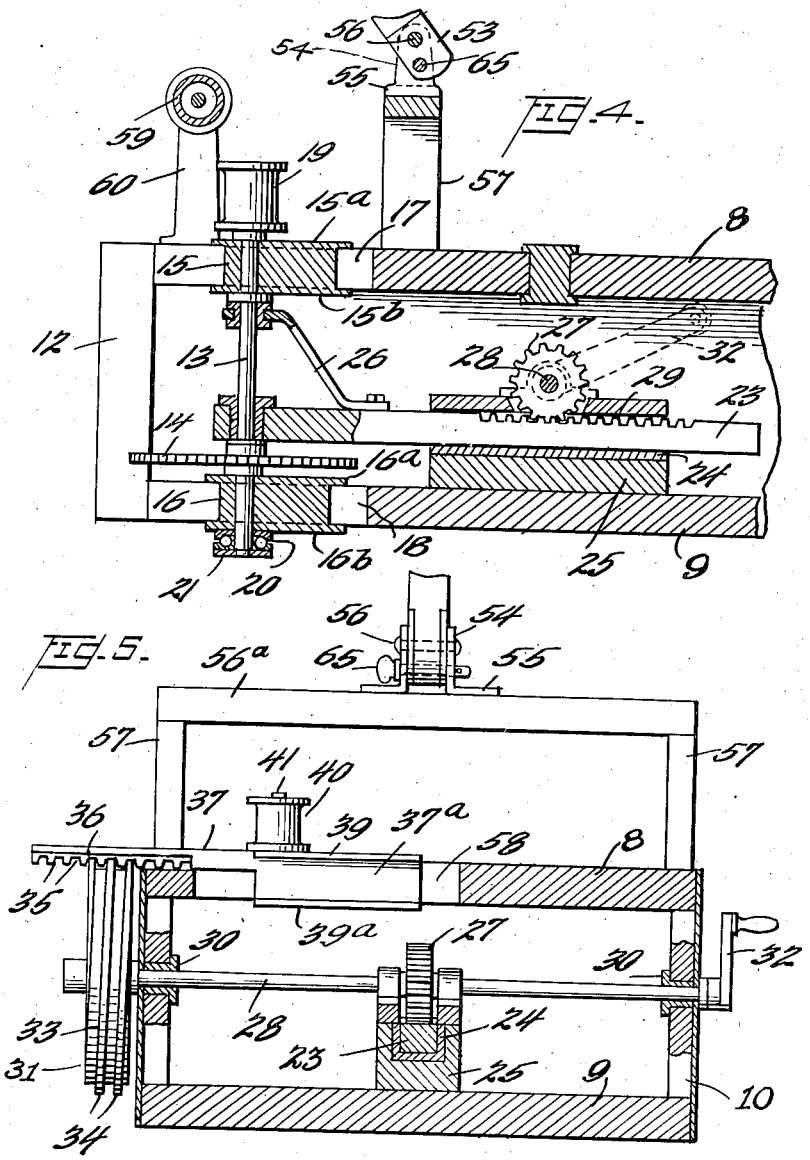

Patented Feb. 8, 1944

2,341,035

UNITED STATES PATENT OFFICE 2,341,035

TIMBER MOWER

Peter Grzelak, Buyck, Minn.

Application September 30, 1942, Serial No. 460,271

3 Claims. (Cl. 143—43)

This invention relates to machines for felling trees and more particularly to tree-felling machines of the type in which a saw is mounted upon a portable truck so that it may be moved from place to place and brought into position for sawing through the trunk of a tree or a stump. Such machines are adapted to be used upon farms for clearing the land of small timber or may be used for commercial logging operations.

An important object of my invention is to provide in a tree-felling machine of the above character—which I term a timber mower—means for slidably shifting the saw blade outwardly and inwardly of the truck so that it may be fed into cutting engagement with a tree.

Another object of the invention is to provide in a machine of the above character, means for driving the saw blade through a flexible transmission member, such as a belt or chain, connected to a source of power and a tensioning member automatically adjustable in consonance with the outward and inward displacement of the saw blade so as to maintain the transmission members taut and in driving engagement with its pulleys or sprockets in all positions of the saw blade.

The invention has as another object to provide in a machine of the above character, a mouth provided upon the truck in advance of the saw blade for engaging the trunk of a tree and more accurately positioning the truck with respect to the tree.

Still another object of the invention is to provide in a machine of the above character a boom operatively connected to a source of power and so constructed and arranged that it may be swung into engagement with and apply leverage to the tree being felled to topple the tree away from the truck. To further aid in laying the tree down in predetermined position upon the ground there may be advantageously provided a pair of guide members at the forward end of the truck adapted to flank opposite sides of the tree and prevent it from falling sidewise.

The invention has as a further object to provide in a machine of the above character means for attaching the truck to an automobile truck or tractor in a manner such that the latter supplies the power to move the machine from place to place and also for driving the saw blade and swinging the boom. In the preferred form of the invention, the boom is so constructed and arranged and so connected to the power plant of the automobile truck or tractor as to afford means for lifting the truck over stumps, boulders or other obstructions commonly encountered in the field.

The invention will be better understood from the following detailed description of a preferred embodiment thereof, reference being had to the annexed drawings in which:

Figure 1 is a view in side elevation of the timber mower;

Figure 2 is a plan view of the timber mower of Fig. 1;

Figure 3 is a horizontal cross-sectional view through the forward end of the truck, parts of the saw blade being broken away for clearness;

Figure 4 is a vertical cross-sectional view through the forward end of the truck on the line 4—4 of Fig. 2;

Figure 5 is a vertical cross-sectional view through an intermediate portion of the truck on the line 5—5 of Fig. 2; and Figure 6 is a detail perspective view of the shoe at the top of the boom for engaging a tree.

In the drawings is illustrated a timber mower comprising a truck 1, the forward end of which is provided with wheels 2 individually supported in spring hangers 3, the rear of the truck being equipped with a coupling 4 for connection to the front end of a tractor T. The coupling comprises an eye bar 5 adapted to fit within a clevis 6 and be detachably held by a coupling pin 7, the eye bar and clevis being pivoted about horizontal axes at right angles to each other to provide a universal connection so that the truck has freedom of movement with respect to the tractor.

The body of the truck comprises a flat upper platform 8 and a flat lower platform 9, preferably made of wood and rigidly connected by upright and transverse framing members 10 extending about the sides of the truck. The framing is covered by light sheet metal 11 to close the sides of the truck body.

At its forward end and centrally thereof the truck is cut away to define an inwardly tapered mouth 12 designed to receive the trunk of a tree (indicated in phantom lines) and, by reason of its tapered sides, to serve as a means for "centering" the truck with respect to the tree.

Fixedly mounted on and located adjacent the lower end of a vertically disposed shaft 13 is a circular saw blade 14. This shaft passes through aligned openings provided in slide blocks 15 and 16 (see Fig. 4). These blocks have upper and lower plates 15a, 15b and 16a, 16b respectively overlying the side edges of guideways 17 and 18 cut in the upper and lower platforms 8 and 9 and leading off from the mouth 12 lengthwise of the truck. The upper end of the shaft 13 extends above the slide block 15 and has a pulley 19 keyed thereon. The weight of the shaft, saw blade and pulley is sustained by an anti-friction bearing 20 resting in a stirrup 21 secured to the under face of the slide block 16. Clearance slots 22 (Fig. 3) are provided to allow the saw blade to pass into and out of the housing provided by the hollow truck body.

For shifting the saw blade inwardly and outwardly along the pair of guideways, there is provided a horizontal rack-bar 23, one end of which is provided with an opening for passing the vertical shaft 13 and its opposite end slidably reposing within a channel member 24, supported on a spacing block 25. A bracket 26 secured at one end to the rack bar and having its other end encircling the shaft 13 prevents any tendency of the shaft to tilt out of vertical position. A pinion 27 fixed upon an adjusting shaft 28 extending crosswise of the truck engages rack teeth 29.

The adjusting shaft 28 is mounted in bearings 30 supported in the side framing 10 of the truck body, and to one end of the shaft projecting beyond the side of the truck is fixed a wheel 31 (see Fig. 5). To the end of the adjusting shaft projecting outwardly from the other side of the truck is fastened a hand crank 32 for turning the adjusting shaft. The wheel 31 is circumferentially provided with a ring 33 having spiral ribs 34 engaging correspondingly formed recesses 35 in a cam plate 36. This cam plate is secured to the lower face of an arm 37 overhanging the wheel and forming part of a slide block 37a shiftable within a guideway 58 cut in the upper platform 8 of the truck body in a direction transversely thereof. Plates 39 and 39a are attached to the slide block so as to overlie the marginal edges of the guideway upon the upper and lower sides of the platform. A belt-tensioning roller 40 is rotatably mounted upon a spindle shaft 41 extending vertically upward from the slide block 37a.

Adjacent the rear end of the truck is a drive shaft 42 extending crosswise of the truck and rotatably journaled in bearings 43 attached to the platform 8 (see Fig. 2). Keyed to the shaft 42 is a pulley 44. Power is transmitted from this pulley to the saw by means of an endless flexible belt 45 which extends around pulleys 19 and 40 and over a fixed idler pulley 46 rotatably mounted upon an upright spindle 47 so located on the upper platform as to lead one flight of the belt 45 back in approximately parallel relation with the other flight in the vicinity of the pulley 44.

A second pulley 48 secured upon shaft 42 is connected by a driving belt 49 to a power take-off mechanism M arranged at the front end of the tractor T. One form of power take-off mechanism which may be advantageously employed in connection with my timber mower is disclosed in Patent No. 1,656,700 of Alfred J. Ersted, dated January 17, 1928, this patent being cited merely by way of example. In this particular embodiment of my invention the belt 49 driving the saw winds over a pulley 50 mounted on a driving shaft at the front end of the tractor, this driving shaft being operated from the engine of the tractor. A roller R applies yielding pressure to the driving belt 49 to maintain the belt tight regardless of changes in position of the truck relative to the tractor.

For exerting pressure against the tree being felled either during or following the sawing operation, there is provided a boom 51 having at its top an arcuate shoe 52 adapted to abut against the side of a tree at a point located a substantial distance above the plane of cut. The lower end of the boom is encased within a socket 53 (Fig. 4), and this socket fits between a pair of upwardly extending arms 54 of a bed block 55 bolted to the upper platform 8. A pin 56 extends through aligned openings in the arms 54, the socket 53 and the boom to provide a pivotal support for the boom about which the boom may be swung into and out of tree-engaging position. A removable locking pin 65 is adapted to be inserted through aligned openings in the bed block and the boom to maintain the boom in raised position for a purpose later to be explained.

In order to clear the belt 45 traversing the upper platform 8, the bed block 55 is supported on a rail 56a extending crosswise of the truck and resting on posts 57 at opposite sides of the truck. An operating cable 58 is intermediately anchored to the boom adjacent its top, one run of the cable passing downwardly from the boom and passing around a guide pulley 59 rotatably mounted upon a bracket iron 60 fixed to the platform 8 at the front of the truck and straddling the mouth opening 12. This run of the cable is then led rearwardly under rail 56a and over shaft 42. The other run of the cable, from the top of the boom, is led rearwardly at an elevation above the shaft 42. The ends of the cables are wound around a drum 62 of the power take-off mechanism M on the tractor, and this drum is adapted to be operatively connected through a suitable clutch with the driving shaft 51 of the take-off.

A pair of horns 63 are pivoted to the platform 8 at the forward end of the truck upon opposite sides of the mouth 12 and are adapted to be swung outwardly so as to slightly clear the circumference of the tree trunk. Clamping nuts 64 are provided to retain the horns in adjusted position.

The operation of the timber mower just described is as follows: The truck 1 having been connected to the front end of a tractor by the universal coupling 4 is pushed forwardly into engagement with a tree to be felled. The trunk of the tree passes into the mouth 12 and because of the convergent shape of the mouth, the truck automatically aligns itself with the saw in proper relationship to the tree. The horns 63 are next swung outwardly to flank opposite sides of the tree and secured in position by the clamping nuts 64.

As the shaft 42 is rotated through its connection with the power take-off M of the tractor T, the saw blade 14 is likewise rotated by the transmission belt 45 which winds around pulleys 44, 19, 40 and 46. The operator, by manually turning the crank 38, rotates the adjusting shaft 28 to which the pinion 27 is affixed, and this pinion through its engagement with the teeth on rack bar 23 shifts the saw blade outwardly into cutting engagement with the tree. At the same time the wheel 31 secured to the end of shaft 28 operates, through engagement of its spiral ribs 34 with the complementary recesses in the cam plate 36, to shift the roller 40 inwardly toward the center of the truck to play out additional belt to compensate for the outward movement of the saw-driving pulley 19.

After the tree has been cut a substantial distance through, the drum 62 of the power take-off M on the tractor T is operated to exert a pull on the cable 58 in such a direction as to move the boom outwardly. The shoe 52 presses the tree backwardly away from the truck so as to relieve pressure from the saw blade and also to finally push the tree down in prearranged location with respect to the truck, the horns preventing sidewise movement of the tree during the initial stage of its fall.

After the tree has been felled, the saw blade is retracted into the truck body and the truck may be moved by the tractor to a new location. Sometimes in pushing the timber mower over the ground a stump or boulder will be encountered which the truck cannot clear. In such cases, the locking pin 65 is inserted in the base of the boom to retain the boom in upright fixed position, and by suitably operating the drum 62 of the power take-off M, the truck is raised about its coupling with the tractor to lift the truck over the obstruction.

It will be understood that instead of a circular saw, any other suitable type of saw—such as a reciprocating saw or a band saw, for example— may be used as the cutting means. Also instead of being made for attachment to a tractor or automobile truck, the timber mower may be built into such a vehicle as a permanent part thereof.

Manifestly various other changes in the structure and design of the timber mower described above may be made without departing from the spirit of my invention as defined by the following claims.

I claim:

1. A timber mower comprising a portable truck, a saw located adjacent an end of the truck and comprising an upright shaft, a circular saw mounted on said shaft for rotation in a horizontal plane and a slide block supporting said shaft, a flexible transmission member adapted to be connected to a source of power for driving said shaft, a roller engaging said transmission member and shiftable transversely of the direction of sliding movement of the slide block for taking up slack in the transmission member, and means for simultaneously shifting said slide block and said roller to lengthen or shorten the effective length of the transmission member in accordance with changes in position of the saw, said slide block and roller shifting means comprising an adjusting shaft extending transversely of the truck, means for rotating the adjusting shaft, a pinion fixed upon said adjusting shaft engaging a rack bar connected to the slide block, a wheel secured to said adjusting shaft provided with a circumferential cam face and an arm rotatably supporting said roller and having a cam plate engaging the cam face of the wheel.

2. A timber mower comprising a portable truck, a circular saw mounted adjacent an end of the truck for sliding movement in a horizontal plane longitudinally of the truck, a flexible transmission member operatively connected to said saw and adapted to be connected to a source of power for driving the saw, a tensioning roller mounted on said truck engaging the transmission member for taking up slack, said tensioning roller being mounted for shifting movement transversely of the truck, an adjusting shaft rotatably supported upon said truck, means for rotating said adjusting shaft, means upon said shaft for slidably adjusting the saw and additional means upon said adjusting shaft for simultaneously adjusting the roller.

3. The combination with a tractor having a power-driven drum thereon, of a timber mower comprising a portable truck, a universal coupling connecting the rear end of said truck with the tractor, a saw located adjacent the front of said truck and means for shifting said saw inwardly and outwardly of said truck in a generally horizontal plane, an upright boom located adjacent the front of the truck and a cable extending between the top of the boom and the drum, whereby said truck may be lifted about its universal coupling by operating the drum.

PETER GRZELAK.